Aug. 16, 1960     J. HIMKA     2,949,331
VEHICLE SEAT ASSEMBLY

Filed March 24, 1958     4 Sheets—Sheet 1

INVENTOR.
John Himka
BY
W. S. Pettigrew
ATTORNEY

Aug. 16, 1960 J. HIMKA 2,949,331
VEHICLE SEAT ASSEMBLY
Filed March 24, 1958 4 Sheets-Sheet 2

INVENTOR.
John Himka
BY
W. Pettigrew
ATTORNEY

Aug. 16, 1960 J. HIMKA 2,949,331
VEHICLE SEAT ASSEMBLY
Filed March 24, 1958 4 Sheets-Sheet 4

INVENTOR.
John Himka
BY
W. S. Pettigrew
ATTORNEY

United States Patent Office

2,949,331
Patented Aug. 16, 1960

2,949,331

VEHICLE SEAT ASSEMBLY

John Himka, Detroit, Mich., assignor to General Motors Corporation, Detroit, Mich., a corporation of Delaware Filed Mar. 24, 1958, Ser. No. 723,195

2 Claims. (Cl. 296—66)

This invention relates to vehicle seats and more particularly to vehicle seat assemblies for multi-purpose vehicle bodies.

The vehicle seat of this invention is intended primarily for use in multi-purpose vehicle bodies such as station wagon bodies. The seating arrangement for bodies of this type generally includes a front or driver's seat and a foldable second seat located rearwardly of the driver's seat and foldable between a normal passenger carrying position and a folded load carrying position when the body is converted for load carrying purposes. When the second seat is in folded position, the seat back thereof is disposed above the seat bottom, with the rear surface thereof located substantially flush with the elevated rear portion of the vehicle body floor which is located above the forward portion of the floor to provide space for the rear wheel and axle structure of the vehicle.

In the past, the second seat bottom has often remained stationary when the second seat back was folded thereover in order that the lower rear edge of the rear surface of the second seat back be located adjacent the forward edge of the elevated floor section to continue the load carrying rear floor portion forwardly of the body without any substantial interruption. This arrangement has certain advantages, but has the one disadvantage in that the load carrying floor area is reduced since unutilized space remains between the upper edge of the rear surface of the folded second seat back and the rear of the driver's seat, with this space being lost for load carrying purposes.

The foldable seat of this invention is intended for use as the second seat of a station wagon body and generally includes a seat bottom and a tiltable seat back. The seat bottom is mounted on the body so as to be displaced forwardly thereof when the seat back is folded thereover, and the seat back is located immediately adjacent to the rear of the front or driver's seat back when in folded position. This leaves a space between the lower rear edge of the rear surface of the folded seat back and the forward edge of the rear floor portion. The invention closes this space by providing a panel which is swingably mounted on the riser portion of the floor between the forward and rear portions thereof and which is operatively connected to the second seat back so as to be moved into the space between the lower rear edge of the rear surface of the second seat back and the forward edge of the elevated rear floor portion when the seat back is folded. Thus, the overall area which may be used for load carrying purposes is increased since substantially all of the permissible area is used.

The primary object of this invention is to provide an improved vehicle seat assembly for multi-purpose vehicle bodies. A more specific object of this invention is to provide an improved vehicle second seat assembly for multi-purpose vehicle bodies which includes a seat back disposed in a generally horizontal position immediately adjacent the front or driver's seat when in folded position substantially flush with but spaced from an elevated floor portion and a panel adapted to be moved into the space between the elevated floor portion and the folded second seat back as an incident to folding movement of the seat back.

These and other objects of this invention will be readily apparent from the following specification and drawings wherein.

Figure 1:
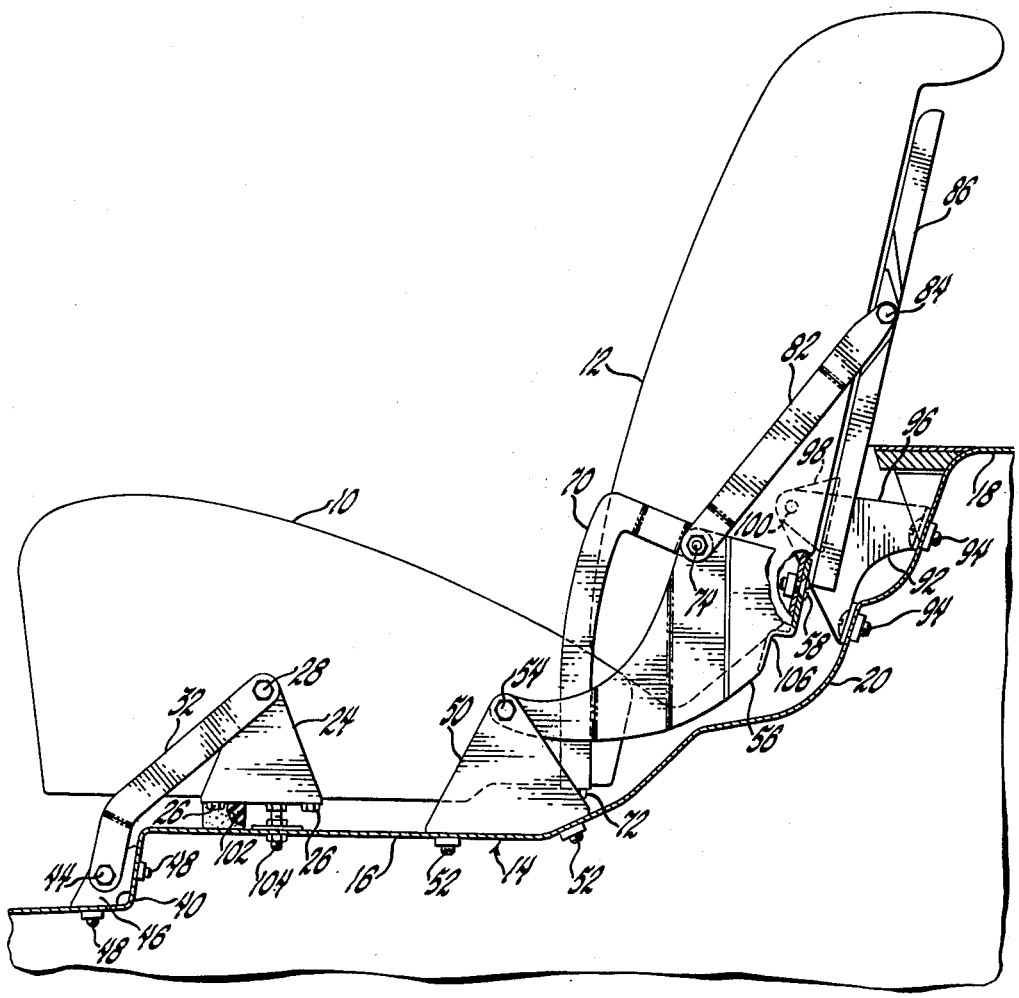
Figure 1 is a side elevational view of a vehicle seat assembly according to this invention in normal position.

Before proceeding with a description of the seat assembly of this invention, it will be understood that a pair of like seat assemblies may be mounted in side by side relationship, with each being operable independently of the other, or that only one seat assembly may be provided to span the body transversely thereof in place of the side by side assemblies. Since both of the side by side assemblies shown in the drawings are of the same construction, only the left hand one will be particularly described. It will be understood that the right hand one is of the same construction, although of different hand, and that like numerals will be used for like parts.

Referring now to Figure 1 of the drawings, a vehicle seat includes a seat bottom 10 and a seat back 12. The seat is mounted within a vehicle body, in a manner to be described, and the body includes a floor 14 which includes a forward floor portion 16, a rear elevated floor portion 18, and an intermediate riser or generally upright floor portion 20 which may be integral with the floor portions 16 and 18 or may be separate and joined thereto.

Figure 3:
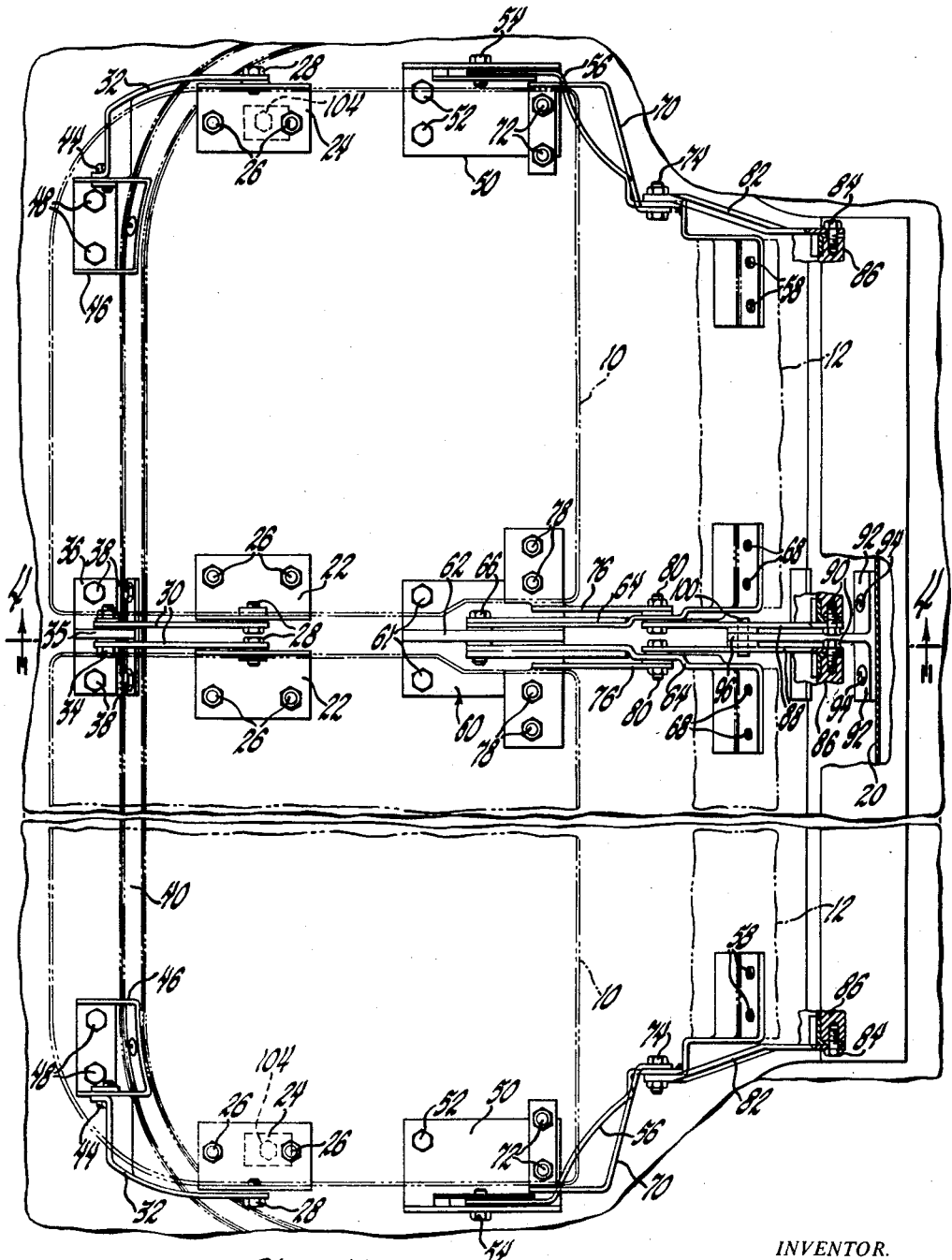
Figure 3 is a plan view of a pair of seat assemblies in side by side relationship.

Referring now particularly to Figures 1 and 3 of the drawings, like inboard and outboard angle brackets 22 and 24, respectively are bolted at 26 to the seat bottom 10 adjacent the forward end thereof, with the upper ends of these brackets being pivoted at 28 to one end of inboard and outboard support links 30 and 32, respectively. The other end of link 30 is pivoted at 34 to the upright central rib 35 of a bracket 36 which is bolted at 38 to a stepped portion 40 of the floor portion 16. The other end of link 32 is pivoted at 44 to an angle bracket 46 which is bolted at 48 to the floor portion 16 and the stepped portion 40 thereof, with pivots 34 and 44 being aligned transversely of the seat.

An outboard angle mounting bracket 50 is bolted at 52 to the floor portion 16 and the upper end of the bracket is pivoted at 54 to an outboard seat back support arm 56 which extends partially around the rear of the seat back 12 and is bolted thereto at 58. An inboard mounting bracket 60 bolted at 61 to floor portion 16 includes a central upright rib 62, and an inboard seat back arm 64 is pivoted to rib 62 at 66, with the pivots 54 and 66 being aligned transversely of the seat. Arms 64 extend partially around the rear of the seat back 12 and is bolted thereto at 68.

Figure 4:
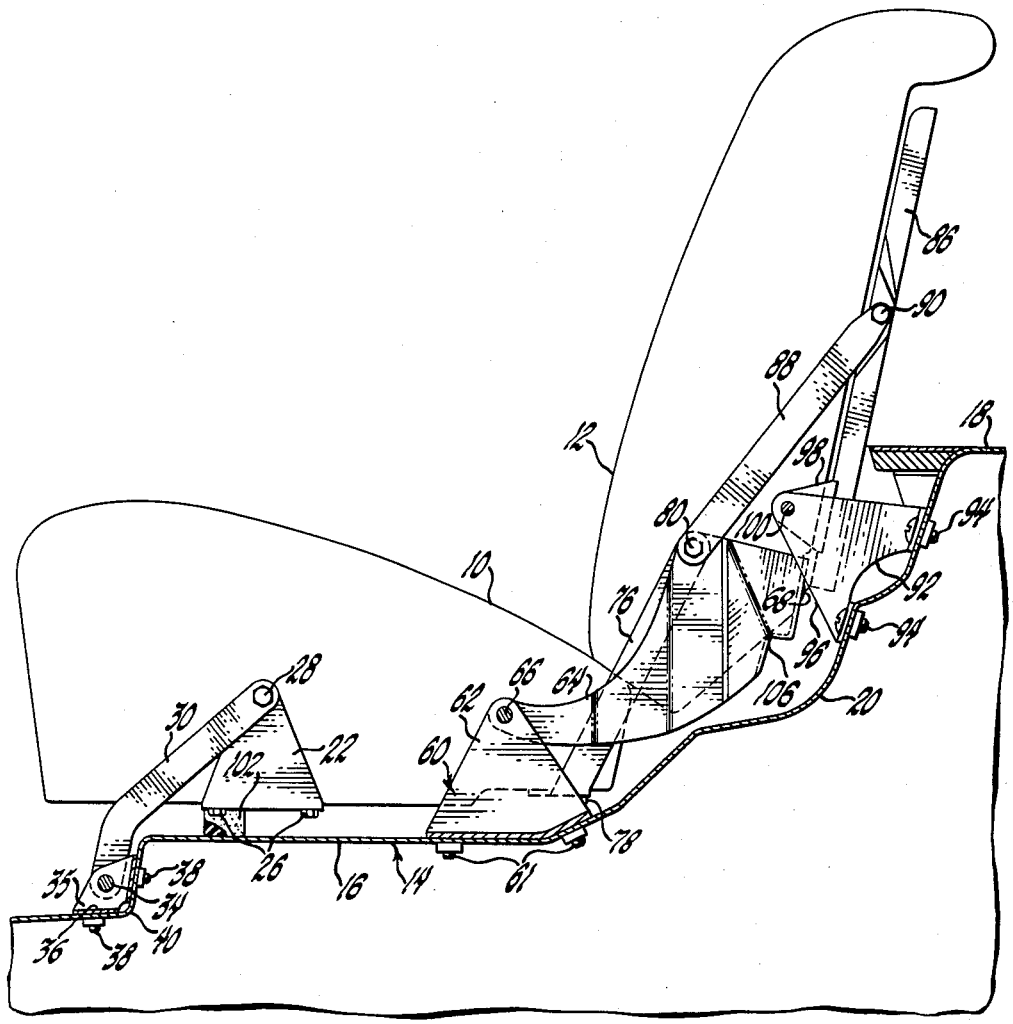
Figure 4 is a view taken along the plane indicated by line 4—4 of Figure 3.

An outboard offset seat bottom support arm 70 is bolted to the seat bottom 10 at 72 adjacent the rearward edge thereof and the offset portion of the arm is pivotally secured to arm 56 at 74. An inboard seat bottom support arm 76 is bolted to the seat bottom 10 at 78 adjacent the rearward edge thereof and is pivoted to the arm 64 at 80, with the pivots 74 and 80 being aligned transversely of the seat. An outboard floor panel support link 82 has one end theereof swingably mounted on the pivot 74 and the other end thereof pivotally secured at 84 to the outboard edge of a floor panel 86. An inboard floor panel support link 88 has one end thereof swingably mounted on the pivot 80 and the other end thereof pivotally secured to the panel 86 at 90, with the pivots 84 and 90 being aligned transversely of the panel 86. A bracket 92 is bolted at 94 to the floor riser 20 and includes a forwardly extending rib 96. An angle bracket 98, Figures 1 and 4, is pivoted at 100 to rib 96 and secured to the panel 86 so as to swingably mount the panel on the floor riser 20.

Figure 2:
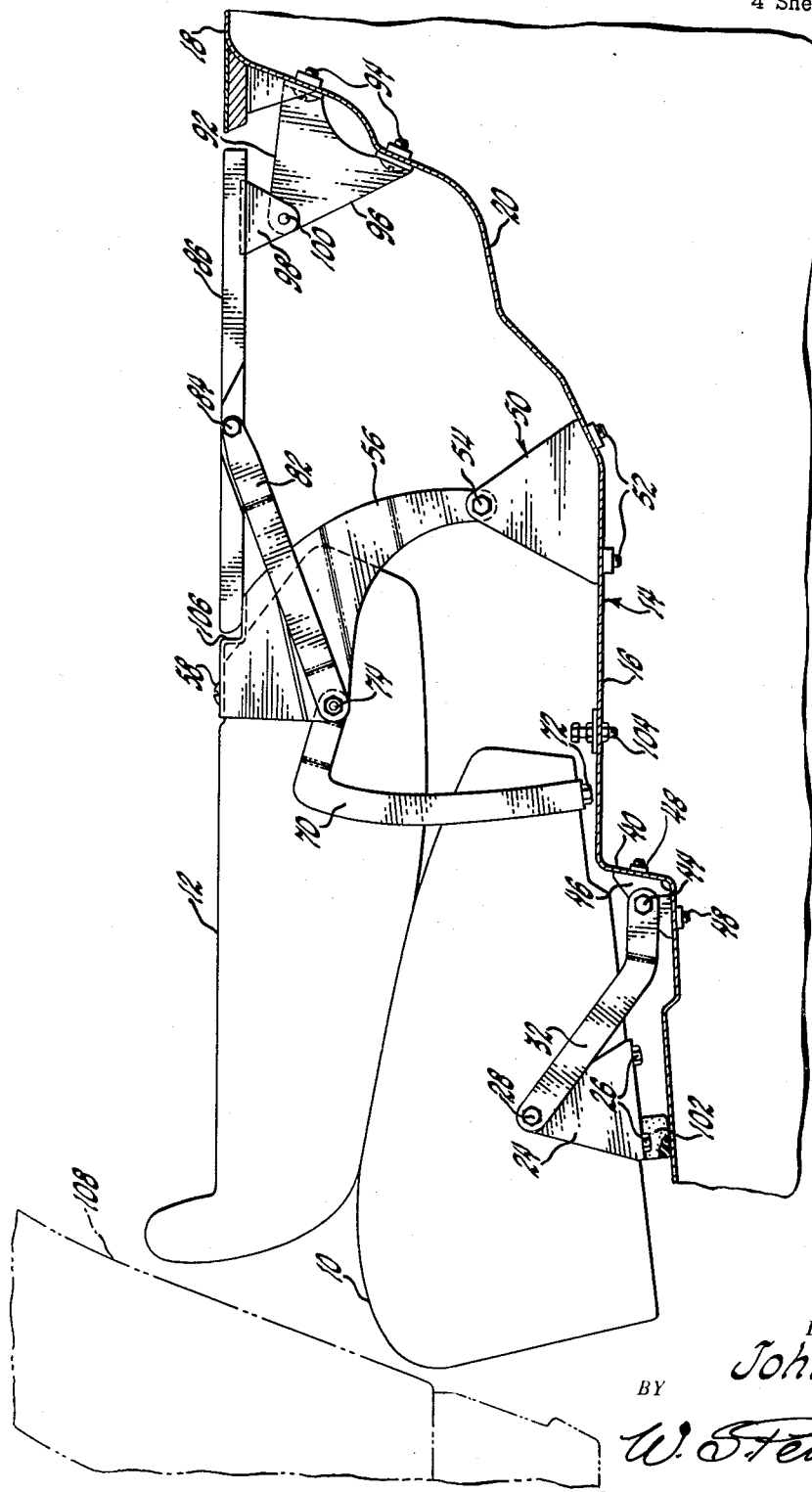
Figure 2 is a view similar to Figure 1 showing the assembly in folded position.

Referring now particularly to Figures 1 and 2 of the drawings, the operation of the left hand seat assembly will be described. The normal position of the seat assembly is shown in Figure 1, and in this position it will be noted that the seat is intended for passenger carrying purposes. However, if it is desired to convert the body for local carrying purposes, the seat back 12 is manually grasped and is swung forwardly and initially upwardly about the pivots 54 and 66. As the seat back swings forwardly and upwardly, the pivots 74 and 80 will be swung forwardly and initially upwardly about the pivots 54 and 66 so that the seat bottom support arms 70 and 76 will be moved forwardly and initially upwardly to in turn move the seat bottom 10 forwardly and initially upwardly as the forward portion of the seat bottom pivots relative to the links 30 and 32 and the links swing forwardly and initially upwardly about the pivots 34 and 44, respectively. Upon continued forward swinging movement of the seat back 12 to its position shown in Figure 2, the pivots 74 and 80 then move forwardly and downwardly to move the support arms 70 and 76 forwardly and downwardly and in turn move the seat bottom 10 forwardly and downwardly to its position shown in Figure 2 as the seat bottom continues to swing relative to the links 30 and 32 and the links swing forwardly and downwardly about the pivots 34 and 44, respectively. Thus the seat back and seat bottom are moved to their position shown in Figure 2.

A rubber bumper 102 is provided on the seat bottom 10 adjacent the inboard edge thereof to support the forward portion of the seat bottom in either its position of Figure 1 or Figure 2, and an adjustable stop 104 is provided on the floor portion 16 adjacent the outboard edge of seat bottom 10 to cooperate with the rubber bumper 102 in supporting the forward portion of the seat bottom 10 in normal position as shown in Figure 1.

During this movement of the seat back 12, the links 82 and 88 are shifted forwardly to swing the panel 86 forwardly about its pivot 100, and when the seat back is disposed in a fully folded position as shown in Figure 2, the panel 86 is located in a horizontal position, with the upper surface thereof substantially flush with the upper surface of the adjacent rear floor portion 18, and with the forward edge thereof fitting within notches 106 provided in the brackets 56 and 64, respectively, whereby the upper surface of the panel is also flush with the rear surface of the seat back 12. Thus the rear floor portion 18 is continued forwardly of the body to substantially adjacent the rear of the front or driver's seat, indicated schematically at 108 in Figure 2, so that substantially all of the permissible area that is available is used for load carrying purposes.

When the seat is returned to its normal position as shown in Figure 1, it is believed that the movement thereof is obvious since it is the reverse of the immediately hereinbefore described movement.

It will be understood, of course, that if a pair of side by side seat assemblies are employed, each may move independently of the other between normal and folded positions.

Thus this invention provides a new and improved seat assembly for multi-purpose vehicle bodies, with this assembly including a panel which is automatically moved into a position to close the space between a folded seat back and the adjacent elevated floor portion when the seat back is disposed in folded position over the seat bottom.

I claim:

1. In a vehicle body of the type including a floor having an elevated floor portion, the combination comprising, a vehicle seat including a seat bottom and a seat back, means mounting said seat back on said body for movement between a normal upright position wherein said seat back extends upwardly above said elevated floor portion adjacent thereto and a folded position wherein said seat back is located above said seat bottom substantially flush with said elevated floor portion and spaced therefrom, a floor panel pivoted to said body on an axis adjacent said elevated floor portion and movable between a normal upright position wherein said panel extends upwardly above said elevated floor portion adjacent said seat back and an operative position wherein said panel is located in the space between said folded seat back and said elevated floor portion substantially flush with each, and link means having one end connected to said panel at a point above said axis when in upright position and having fixed at the other end pivot means connected to said back for moving said panel between said upright and operative position as an incident to folding movement of said seat back.

2. In a vehicle body of the type including a floor having an elevated floor portion, the combination comprising, a vehicle seat including a seat bottom and a seat back, means swingably supporting the forward portion of said seat bottom on said body, means swingably mounting said seat back on said body and swingably supporting the rear portion of said seat bottom for movement of said back between a normal upright position wherein said seat back extends upwardly above said elevated floor portion adjacent thereto and a folded position wherein said seat bottom is displaced forwardly in said body and said seat back is located thereabove substantially flush with said elevated floor portion and spaced therefrom, a floor panel pivoted to said body on an axis adjacent said elevated floor portion and movable between a normal upright position wherein said panel extends upwardly above said elevated floor portion adjacent said seat back and an operative position wherein said panel is located in the space between said folded seat back and said elevated floor portion substantially flush with each, and link means having one end pivotally connected to said panel at a point above said axis when in upright position and having fixed at the other end pivot means connected to said back for moving said panel between said upright and operative positions upon movement of said seat back between said normal and folded positions.

References Cited in the file of this patent

UNITED STATES PATENTS

| 1,841,290 | Katzman | Jan. 12, 1932 |

FOREIGN PATENTS

| 694,578 | Germany | Aug. 3, 1940 |
| 345,908 | Great Britain | Apr. 2, 1931 |
| 249,708 | Italy | Aug. 7, 1926 |